(12) United States Patent
Nishino et al.

(10) Patent No.: US 7,298,430 B2
(45) Date of Patent: Nov. 20, 2007

(54) LIQUID CRYSTAL DISPLAY DEVICE

(75) Inventors: Tomonori Nishino, Mobara (JP);
Masayuki Hikiba, Mobara (JP);
Kouichi Anno, Mobara (JP)

(73) Assignee: Hitachi Displays, Ltd., Chiba-ken (JP)

( * ) Notice: Subject to any disclaimer, the term of this patent is extended or adjusted under 35 U.S.C. 154(b) by 0 days.

(21) Appl. No.: 10/760,394

(22) Filed: Jan. 21, 2004

(65) Prior Publication Data

US 2004/0150759 A1    Aug. 5, 2004

(30) Foreign Application Priority Data

Feb. 7, 2003    (JP) .............................. 2003-030657

(51) Int. Cl.
*G02F 1/1343*    (2006.01)
(52) U.S. Cl. .......................... 349/38; 349/114; 349/110
(58) Field of Classification Search .................. 349/38, 349/149–152, 39, 111, 114, 43, 110, 138
See application file for complete search history.

(56) References Cited

U.S. PATENT DOCUMENTS

| | | | |
|---|---|---|---|
| 5,671,027 A * | 9/1997 | Sasano et al. ................ 349/46 |
| 6,330,047 B1 * | 12/2001 | Kubo et al. .................. 349/147 |
| 6,657,696 B2 * | 12/2003 | Aruga ......................... 349/150 |
| 6,707,511 B2 * | 3/2004 | Kim et al. ..................... 349/38 |
| 6,710,827 B2 * | 3/2004 | Kubo et al. .................... 349/55 |
| 6,912,034 B2 * | 6/2005 | Nagano et al. ............. 349/144 |

2002/0033918 A1    3/2002    Shigeno et al.
2003/0086043 A1    5/2003    Seo et al.

FOREIGN PATENT DOCUMENTS

JP    2000-194016    12/1999
JP    2001-350158    6/2000

* cited by examiner

*Primary Examiner*—Thoi V. Duong
(74) *Attorney, Agent, or Firm*—Reed Smith LLP; Stanley P. Fisher, Esq.; Juan Carlos A. Marquez, Esq.

(57) ABSTRACT

The liquid crystal display device of the present invention can prevent the generation of the frame-like brightness difference at a portion which surrounds a light transmitting region. A pixel region formed over one substrate SUB1 which constitutes a liquid crystal display device includes a light transmitting region LTA which allows transmitting of light and a light reflecting region LRA which allows reflection of light. The light transmitting region LTA includes a first pixel electrode TPX formed of a conductive layer having the light transmitting property, while the light reflecting region LRA is formed of a second pixel electrode RPX formed of a conductive film having the non-light-transmitting property. A holding capacitance electrode CT which is connected to a holding capacitance line CL is formed below the second pixel electrode RPX. The holding capacitance electrode is formed of a material having light shielding property and is arranged such that the holding capacitance electrode is overlapped to a boundary portion between the light transmitting region LTA and the light reflecting region LRA, whereby the generation of the frame-like brightness difference at the portion which surrounds the light transmitting region LTA can be prevented.

2 Claims, 7 Drawing Sheets

LIQUID CRYSTAL DISPLAY DEVICE

BACKGROUND OF THE INVENTION

The present invention relates to a liquid crystal display device, and more particularly to a so-called partial transmissive-type liquid crystal display device.

A partial transmissive-type liquid crystal display device includes a region which reflects an external light and a region which allows transmitting of light from a back light in one pixel. Such a liquid crystal display device is popularly used in an equipment which is used indoors as well as outdoors such as a mobile phone, for example. The liquid crystal display device displays images using the external light when a using environment is bright and displays images using light from the backlight when the using environment is dark (see Japanese Unexamined Patent Publication 2001-350158 (patent literature 1) for example).

Generally, the partial transmissive-type liquid crystal display device is constituted of two transparent substrates made of glass or the like which are arranged to face each other in an opposed manner with a liquid crystal layer therebetween. Then, on one transparent substrate out of two transparent substrates, a plurality of gate lines which extend in the first direction (X direction, usually horizontal direction) and are arranged in parallel in the second direction (Y direction, usually vertical direction) and a plurality of drain lines which extend in the Y direction and are arranged in parallel in the X direction are formed. A region on which the plurality of gate lines and the plurality of drain lines are formed constitutes a pixel region. In the pixel region, a plurality of pixels each of which is constituted of a switching element such as a thin film transistor or the like and a pixel electrode are formed. Then, the above-mentioned switching elements are formed in the vicinity of crossing portions between the gate lines and drain lines, and in a region which is surrounded by two neighboring gate lines and two neighboring drain lines, one pixel is formed using the above-mentioned switching element and pixel electrode. The switching element is selectively operated in response to a scanning signal supplied from the gate line, while a video signal from the drain line is supplied to the pixel electrode through the switching element.

Each pixel electrode of the partial transmissive-type liquid crystal display device is constituted of a light-transmitting pixel electrode and a light-reflecting pixel electrode which are arranged in one pixel region. One pixel electrode formed on two transparent substrates having the light transmitting property is formed of a light transmitting conductive layer such as ITO (Indium-Tin-Oxide), for example, while another pixel electrode having the light reflecting property is formed of a non-light-transmitting conductive layer such as a metal layer made of aluminum (Al) or the like.

Further, on another transparent substrate out of two transparent substrates which constitute the liquid crystal display device, a counter electrode formed of a light transmitting conductive layer is formed, wherein the counter electrode is formed in common with respective pixel regions. Then, an electric field is generated between the pixel electrode formed on one transparent substrate and the counter electrode formed on another transparent substrate, and images are displayed by turning on or off the pixel by controlling the orientation direction of liquid crystal molecules which constitute a liquid crystal layer within the pixel region in response to the electric field.

In the partial transmissive-type liquid crystal display device, an insulation film is formed over the pixel electrode formed of the light transmitting conductive layer, a light transmitting region is formed by removing a portion of the insulation film thus exposing the pixel electrode formed of the light transmitting conductive layer, and the previously-mentioned pixel electrode is formed of the non-light transmitting conductive film in the region above the insulation film and excluding the light transmitting region thus forming a light reflecting region. Further, there has been also known a multi-domain liquid crystal display element in which a common electrode made of metal such as Al is formed such that the common electrode surrounds the pixel region, and the pixel electrode and the common electrode are formed to be overlapped to each other (see paragraphs 0014-0015, 0020, 0031 of Japanese Unexamined Patent Publication 2000-194016 (patent literature 2)).

SUMMARY OF THE INVENTION

On the other hand, recently, a liquid crystal display device having higher definition has been demanded and hence, the number of pixels of the liquid crystal display device has been increasing. In the partial transmissive-type liquid crystal display device, the frame-like brightness difference is generated in the vicinity of a boundary portion between the light reflecting region and the light transmitting region at the time of display. As a result of an investigation of a cause of such a phenomenon, the following matter has been found. That is, a steep stepped portion is formed at a portion corresponding to a side wall surface of an opening which is formed by removing the insulation film and hence, a favorable orientation film cannot be formed due to the presence of the stepped portion. Accordingly, the disturbance is liable to be easily generated in the orientation of the liquid crystal layer in the vicinity of the insulation film of the light transmitting region and hence, it is difficult to control the liquid crystal layer at the portion where the orientation is disturbed thus giving rise to a defective display. This defective display is a phenomenon in which, at the time of performing a black display in a light transmitting mode, light of a backlight is leaked from the portion where the orientation is disturbed and hence, the perfect black display cannot be obtained at the portion. As a result, images which have the degraded contrast are displayed on an image display screen.

It is an advantage of the present invention to realize an image display of high contrast by preventing a frame-like brightness difference which is generated in the vicinity of a boundary portion between a light reflecting region and a light transmitting region of one pixel in a partial transmissive-type liquid crystal display device.

To briefly explain the summary of representative inventions among inventions disclosed in this specification, they are as follows.

In a liquid crystal display device which includes a first substrate and a second substrate which are arranged to face each other with a liquid crystal layer therebetween, wherein the first substrate includes a plurality of gate lines which extend in a first direction (usually horizontal direction, X direction in the drawings of embodiments described later) and are arranged in parallel in a second direction (usually vertical direction, Y direction in the drawings of the embodiments described later) which crosses the first direction, a plurality of drain lines which extend in the second direction and are arranged in parallel in the first direction, and holding capacitance lines (also referred to as storage lines) which are arranged in parallel to the gate lines, a pixel and a switching element are provided to a region which is surrounded by two neighboring gate lines out of the plurality of gate lines and two neighboring drain lines out of the plurality of drain lines, the pixel includes a light transmitting region which allows light incident from a back surface of the first substrate to pass therethrough and a light reflecting region which allows light incident from the second substrate side to be reflected thereon, the light transmitting region includes a first pixel electrode having the light transmitting property and the light reflecting region includes a second pixel electrode having the light reflecting property, an insulation film and a holding capacitance electrode which is connected to the holding capacitance line are provided below the second pixel electrode, and the holding capacitance electrode is formed in an overlapped manner to a boundary portion between the light transmitting region and the light reflecting region.

The first pixel electrode is formed over the holding capacitance electrode and a holding capacitance is formed by way of an anodized film formed over the holding capacitance electrode.

Further, a liquid crystal display device includes a first substrate and a second substrate which are arranged to face each other with a liquid crystal layer therebetween, a plurality of gate lines which are arranged in parallel on one of the first substrate and the second substrate, and a plurality of drain lines which are arranged to cross respective gate lines of the plurality of gate lines and are arranged in parallel, regions which are surrounded by the gate lines and the drain lines constitute pixel regions, and each pixel region includes a switching element which is operated in response to a scanning signal applied from the gate line and a pixel electrode to which a video signal is supplied from the drain line through the switching element, the pixel electrode is constituted of a first pixel electrode formed of a light transmitting conductive layer which is disposed in one light transmitting region defined in the pixel region and a second pixel electrode formed of a non-light transmitting conductive film which is disposed in another light reflecting region defined in the pixel region, an insulation film is formed above the first pixel electrode and an opening which allows the first pixel electrode to be exposed is formed in a region of the insulation film corresponding to the light transmitting region, the second pixel electrode is formed over the light reflecting region of the insulation film, and a holding capacitance electrode which is formed on the same layer as the gate line is arranged at a portion corresponding to a side wall surface of the opening of the insulation film.

Here, a backlight is provided to a back surface of the first substrate and is used as a light source in a light transmitting display mode (a light transmitting mode).

Due to the above-mentioned constitution, the generation of the frame-like brightness difference in the portion which surrounds the light transmitting region is prevented and hence, an image display of high quality can be realized.

The present invention is not limited to the above-mentioned constitutions and various modifications are conceivable without departing from the technical concept of the present invention.

DESCRIPTION OF THE PREFERRED EMBODIMENTS

An embodiment of a liquid crystal display device according to the present invention is explained in conjunction with drawings hereinafter. Same symbols are given to identical portions. The liquid crystal display device is used in a television set, a personal computer, a display of a portable terminal or the like. The liquid crystal display device is light-weighted and exhibits the small power consumption and hence, the liquid crystal display device is utilized as a display means of a miniaturized electronic terminal of a mobile phone or the like. Further, since the portable terminal is used indoors and outdoors, a partial transmissive-type liquid crystal display device is used. The partial transmissive-type liquid crystal display device displays an image using an external light when a using environment is bright and displays an image using a light from a backlight which is arranged on a back surface when the using environment is dark. A light reflecting mode is used in the former case and the light transmitting mode is used in the latter case. In the liquid crystal display device, a first substrate and a second substrate which are preferably made of glass are arranged to face each other with a liquid crystal layer therebetween and a backlight is provided to a back surface of the first substrate.

Figure 1:
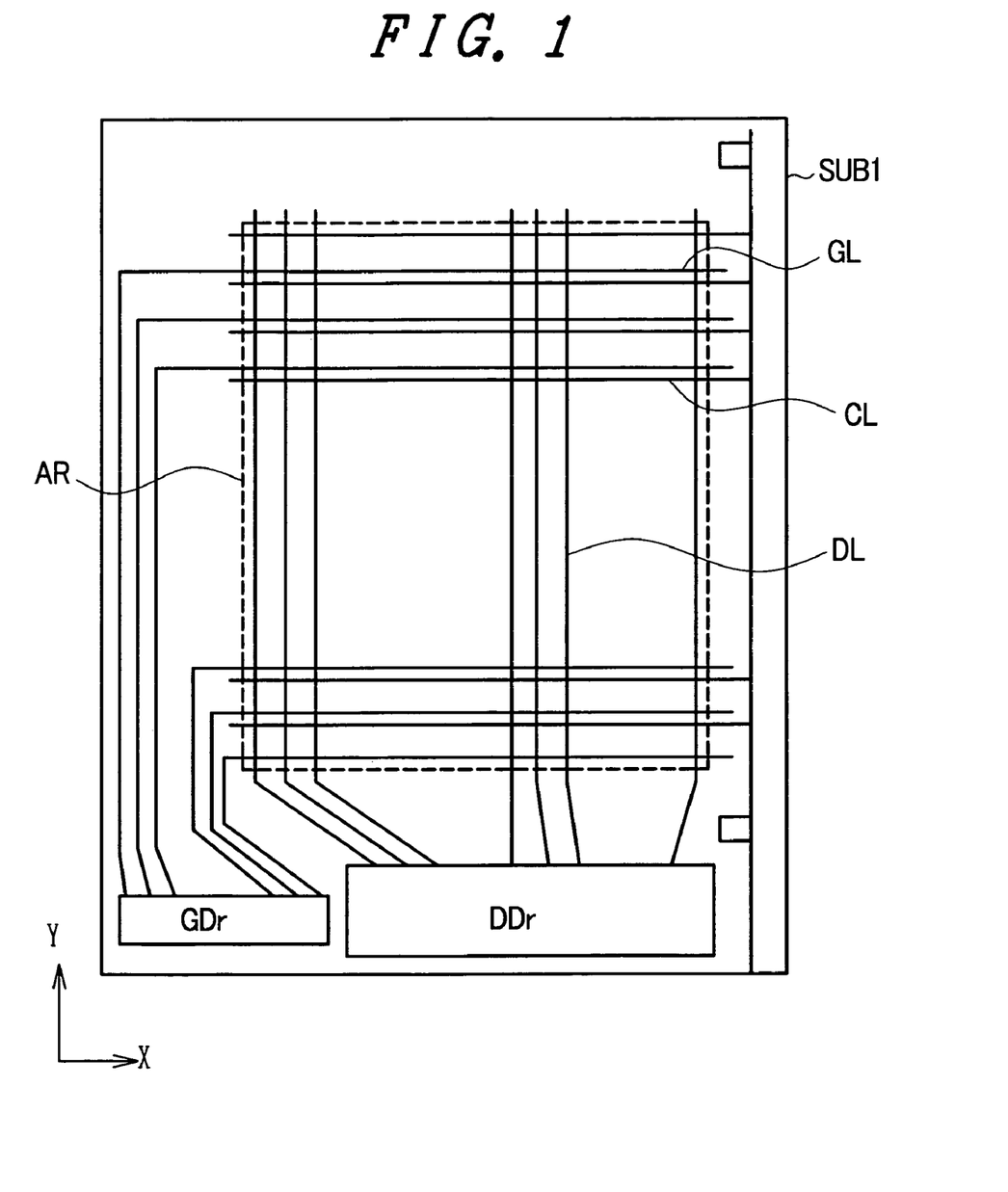
FIG. 1 is a schematic view showing wiring when a liquid crystal display device of the present invention is viewed from an image observation window side.

FIG. 1 is a schematic view showing wiring of the liquid crystal display device as viewed from an image observation window side. A first substrate SUB1 includes a plurality of gate lines GL which extend in the X direction (horizontal direction) and are arranged in parallel in the Y direction (vertical direction) in the pixel region AR, a plurality of drain lines DL which extend in the Y direction in the pixel region AR, and a plurality of holding capacitance lines (also referred to as storage lines) CL which are arranged parallel to the gate lines GL. A region in which the gate lines GL and the drain lines DL which cross each other are formed constitutes a pixel region AR. In the pixel region AR, a region which is surrounded by two neighboring gate lines GL and two neighboring drain lines DL form one pixel. It is possible to display a color image on a panel front surface using three types of pixels (red pixel, green pixel, blue pixel). Here, gate lines GL are driven by a gate driver GDr and the drain lines DL are driven by a drain driver DDr.

Figure 2:
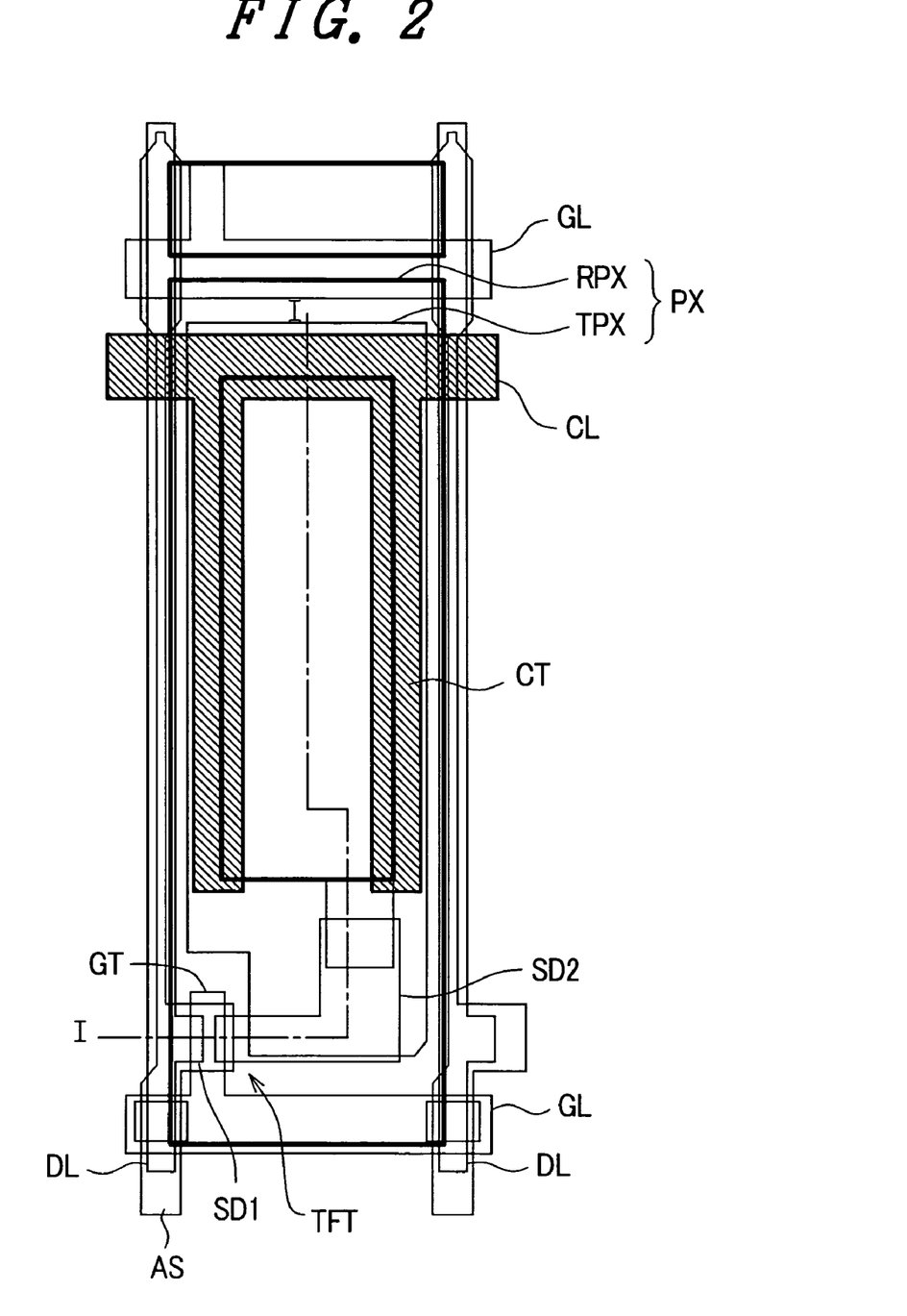
FIG. 2 is a plan view showing one embodiment of a pixel of the liquid crystal display device according to the present invention.
Figure 3:
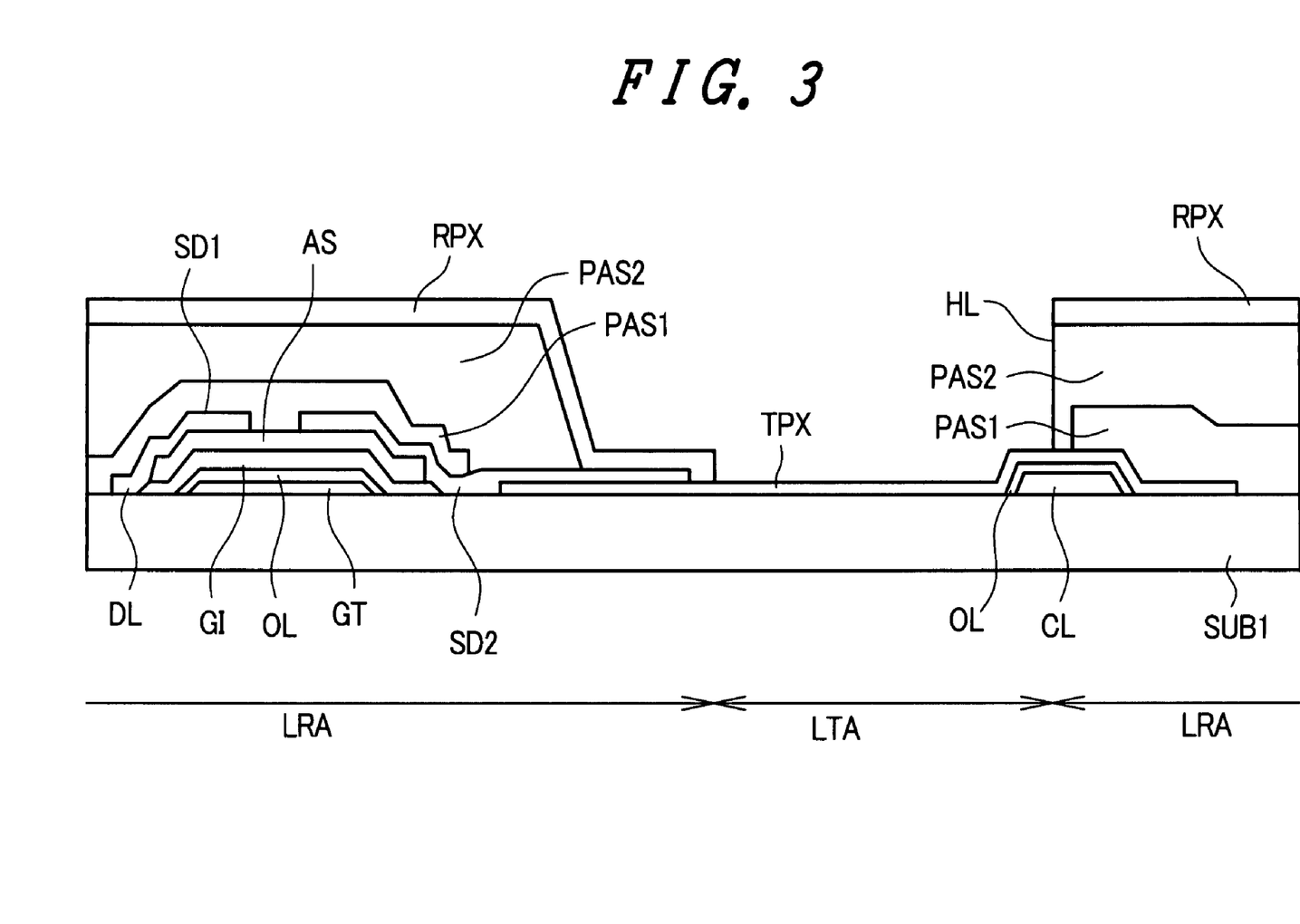
FIG. 3 is a cross-sectional view taken along a line I-I in FIG. 2.

FIG. 2 is a plan view showing one embodiment of the constitution of the pixel of the liquid crystal display device according to the present invention and FIG. 3 is a cross-sectional view taken along a line I-I in FIG. 2. Inside one pixel, a switching element TFT which is controlled in response to a scanning signal from the gate line GL and a pixel electrode PX to which a video signal from the drain line DL is supplied through the switching element TFT are provided. In many liquid crystal display devices, a thin film transistor is used as the switching element and hence, the explanation is made assuming that the switching element is formed of the thin film transistor. Further, the pixel includes a light transmitting region LTA which allows light from the back surface of the first substrate to pass therethrough and a light reflecting region LRA which reflects light incident from the second substrate side thereon. The light transmitting region LTA includes a first pixel electrode having the light transmitting property (also referred to as a light transmitting electrode), while the reflecting region LRA includes a second pixel electrode having the light reflecting property (also referred to as a light reflecting electrode). A pixel electrode PX is constituted of the light reflecting electrode RPX and the light transmitting electrode TPX. A region where the light reflecting electrode is not formed in one pixel constitutes the light transmitting region LTA.

Below the light reflecting electrode RPX, the gate line GL, the gate electrode GT, the drain line DL, a drain electrode SD1, a semiconductor layer AS, a storage line CL, a holding capacitance electrode (also referred to as a storage electrode) CT, and the pixel electrode (light transmitting electrode) TPX which is formed of the light transmitting conductive layer are formed. Further, a holding capacitance electrode CT which is connected to the storage line CL and forms a holding capacitance is formed below the second pixel electrode. As viewed from the second substrate side not shown in the drawing, the holding capacitance electrode CT is formed such that the holding capacitance electrode CT is overlapped to a boundary portion between the light transmitting region LTA and the light reflecting region LRA. Further, the holding capacitance electrode CT is formed of a material having a light shielding property. Here, an opening HL is formed in a region of an insulation film PAS2 corresponding to the light transmitting region LTA. The opening HL is formed to make a length of an optical path of light which passes the inside of the liquid crystal layer in the light transmitting region LTA and a length of an optical path of light which passes the inside of the liquid crystal layer in the light reflecting region LRA substantially equal.

On a liquid-crystal-layer-side surface of the transparent substrate SUB1 which constitutes the first substrate, the gate lines GL are formed and portions thereof slightly extend toward the pixel region side. The extension portions form the gate electrodes GT of the thin film transistors TFT. The gate lines GL and the gate electrodes GT are formed of, for example, aluminum (Al) or an alloy thereof and an anodized film OL which is formed by anodizing a surface thereof.

Further, inside the pixel region, the holding capacitance lines CL which extend in the X direction in the drawing are formed and these holding capacitance lines CL are arranged close to the gate lines GL which are positioned at the upper portion in the drawing. The holding capacitance lines CL have portions thereof which relatively largely extend to the center side of the pixel region and holding capacitance electrodes CT of the capacitive elements Cstg described later are formed of these extension portions.

Further, the pixel according to this embodiment forms the light transmitting region LTA at the substantially center of the region thereof and also forms the light reflecting region LRA such that the light reflecting region LRA surrounds the light transmitting region LTA. At a portion corresponding to a boundary portion between the light transmitting region LTA and the light reflecting region LRA, the holding capacitance electrode CT having a given width is formed. The holding capacitance electrode CT also functions as a light shielding layer at a portion where the light reflecting electrode is not formed. Further, the holding capacitance lines CL are also arranged in the light transmitting region LTA.

The holding capacitance electrodes CT and the holding capacitance lines CL are formed in the same step for forming the gate signal lines GL, for example, and are made of aluminum (Al) or an alloy thereof. Further, an anodized film OL is formed over a surface of the holding capacitance electrode CT and a surface of the holding capacitance line CL. Still further, inside the pixel region, a conductive layer having the light transmitting property which is made of ITO (Indium Tin Oxide), ITZO (Indium Tin Zinc Oxide), IZO (Indium Zinc Oxide), $SnO_2$ (tin oxide), $In_2O_3$ (indium oxide) or the like is formed. The light-transmitting conductive layer is formed such that the conductive layer sufficiently covers the light transmitting region LTA and plays a role of a pixel electrode TPX in the light transmitting region LTA.

Further, the light-transmitting conductive layer is also formed over the holding capacitance electrode CT and the holding capacitance line CL, for example. An anodized film OL is formed over a surface of the holding capacitance electrode CT and a surface of the holding capacitance line CL. The anodized film OL constitutes one dielectric film of the capacitive element Cstg.

In the partial transmissive-type liquid crystal display device of the present invention, the holding capacitance electrode also functions as a light shielding layer and hence, it is possible to enlarge the light transmitting region without decreasing a holding capacitance. Further, a sequential stacked body consisting of a gate insulation film GI and a semiconductor layer AS made of amorphous Si is formed such that the sequential stacked body strides over the gate electrode GT. The gate electrode GT, the gate insulation film GI and the semiconductor layer AS are members which constitute the thin film transistor TFT. By forming a drain electrode and a source electrode over an upper surface of the semiconductor layer AS, a MIS (Metal Insulator Semiconductor) transistor having a so-called inverse-staggered structure is formed.

Here, the sequential stacked body constituted of the gate insulation film GI and the semiconductor layer AS extends such that the sequential stacked body covers the whole area of the region where the drain line DL is formed and hence, in forming the drain line DL, the drain signal line DL is formed over a portion having no stepped portion. This provision is made to prevent the generation of broken step of the drain signal line DL due to the stepped portion.

Further, a portion of the drain line DL includes an extension portion which extends to a position above the semiconductor layer AS in the region where the thin film transistor TFT is formed and the extension portion is configured to form a drain electrode SD1 of the thin film transistor TFT.

Further, at the time of forming the drain line DL, a source electrode SD2 is formed in a spaced-apart manner from the drain electrode SD1 by a length corresponding to a channel length of the thin film transistor TFT. The source electrode SD2 has an extension portion which extends to a position above the light transmitting electrode TPX. The extension portion is formed for establishing the connection between the source electrode and the light reflecting electrode RPX.

Further, over a surface of the first substrate SUB1 having such a constitution, an inorganic protective film PAS1 which constitutes a portion of a protective film PAS is formed using a silicon nitride film or the like, for example. Further, over a surface of the inorganic protective film PAS1, an organic protective film PAS2 is formed using a material such as resin, for example. Using the above-mentioned inorganic protective film PAS1 and organic protective film PAS2, the protective film PAS which mainly obviates the direct contact of the thin film transistor TFT with the liquid crystal is constituted. The reason for adopting such a constitution is to reduce the dielectric of the protective film PAS as a whole.

Here, an opening HL which is formed in the organic protective film PAS2 constitutes the light transmitting region LTA in the pixel region and the light transmitting electrode TPX which is exposed from the opening HL functions as the pixel region PX in the light transmitting region LTA. The opening HL is formed in an area corresponding to the light transmitting region LTA of the organic protective film PAS2. Further, the organic protective film PAS2 is formed such that a length of an optical path of light which passes through the inside of the liquid crystal in the light transmitting region LTA and a length of an optical path of light which passes through the inside of the liquid crystal in the light reflecting region LRA become substantially equal.

Further, over a surface of the organic protective film PAS2, that is, over a region corresponding to the light reflecting region LRA, the light reflecting electrode RPX which also functions as a light reflecting plate is formed. The light reflecting electrode RPX is formed of Al, an alloy thereof, or a stacked body which contains Al or the alloy thereof. In any case, the light reflecting electrode RPX is made of a material having a favorable reflection efficiency. When the light reflecting electrode RPX is formed of the stacked body, an uppermost layer is formed of the material having the favorable reflection efficiency.

Further, the light reflecting electrode RPX is configured such that the light reflecting electrode RPX is connected to the source electrode SD2 of the thin film transistor TFT through the opening HL formed in the protective film PAS2 and assumes a potential equal to a potential of the light transmitting electrode TPX in the light transmitting region LTA. Further, the formation of the light reflecting electrode RPX in the light transmitting region LTA, that is, the formation of the light reflecting electrode RPX inside the opening formed in the protective film PAS2 is obviated. Accordingly, the light reflecting electrode RPX formed in the light reflecting region LRA and the pixel electrode TPX formed in the light transmitting region LTA are defined by the side wall surface of the opening formed in the protective film PAS2 as observed in a plan view.

An orientation film is formed over the surface of the first substrate SUB1 having such a constitution. The orientation film determines the initial orientation of molecules of the liquid crystal by directly coming into contact with the liquid crystal.

In the liquid crystal display device having such a constitution, the holding capacitance electrode CT and the holding capacitance line CL are, as shown in FIG. 1 and FIG. 3, formed such that these electrodes stride over the boundary portion between the light transmitting region LTA and the light reflecting region LRA. The light transmitting region LTA constituted of a portion of the organic protective film PAS2 where the opening is formed, while the light reflecting region LRA is constituted of a portion of the organic protective film PAS2 where the protective film PAS2 is formed. Due to such a constitution, the boundary portion between the light transmitting region LTA and the light reflecting region LRA corresponds to the side wall surface of the opening formed in the organic protective film PAS2.

To approximate the length of the optical path in the light transmitting region and the length of the optical path in the light reflecting region to each other, the organic protective film PAS2 is formed with a large thickness. Accordingly, in the light transmitting region close to the side wall surface of the opening formed in the organic protective film PAS2, it is difficult to perform the rubbing treatment of the orientation film with high accuracy and hence, this portion constitutes a portion where the orientation of the liquid crystal is not sufficiently obtained.

Accordingly, in performing a black display in the light transmitting region LTA, there is no possibility that the complete black display is performed in the portion and a frame-like pattern is recognized. In view of the above, the holding capacitance electrode CT and the holding capacitance line CL are formed over the portion so as to eliminate the above-mentioned drawback.

Figure 4:
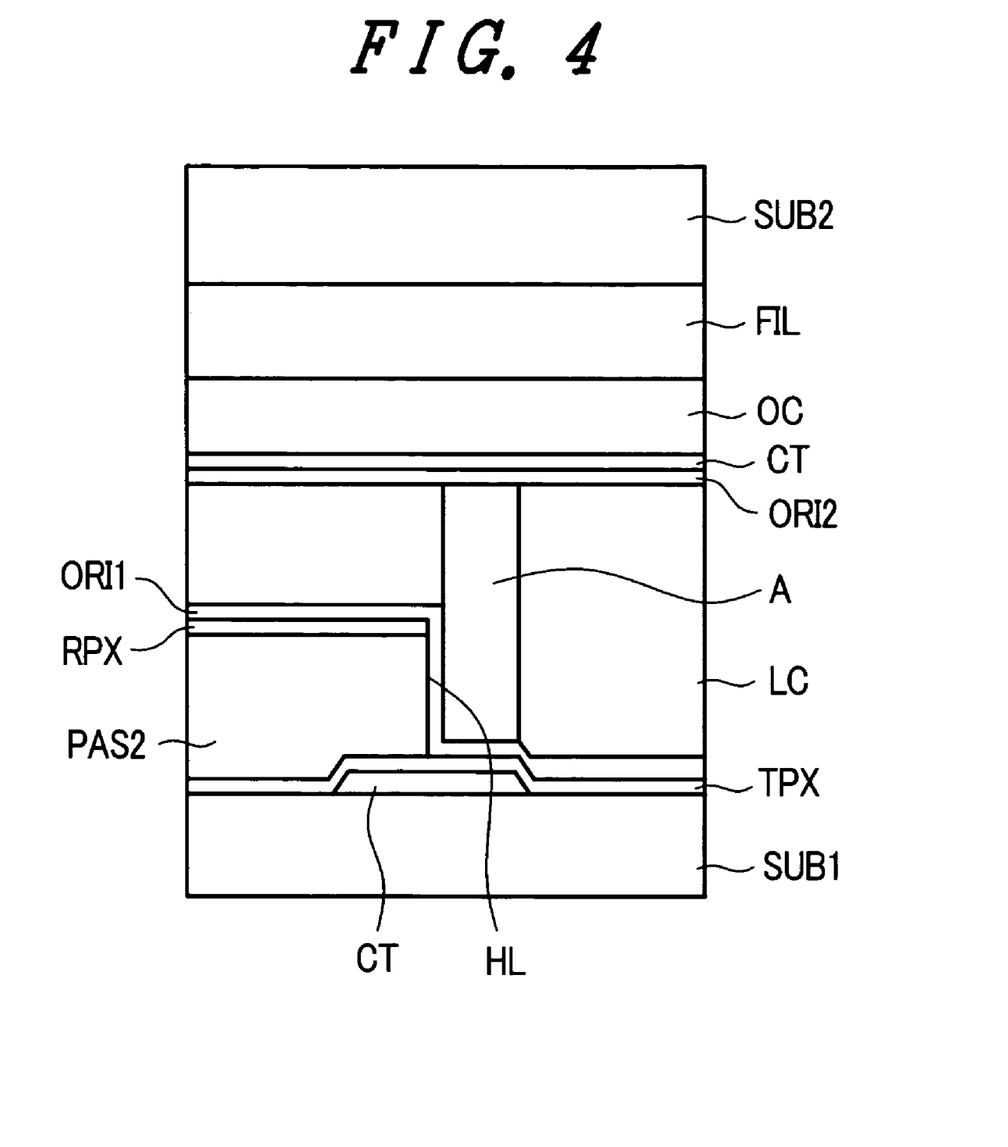
FIG. 4 is a cross-sectional view for explaining an advantageous effect of one embodiment of the present invention.

FIG. 4 is a cross-sectional view of the boundary portion between the light transmitting region LTA and the light reflecting region LRA. The orientation film ORI1 which is arranged to be in contact with the liquid crystal layer cannot receive the proper rubbing treatment at the side wall surface of the opening HL formed in the organic protective film PAS2 and a bottom surface of the opening HL in the vicinity of the side wall surface. Accordingly, the liquid crystal (indicated by "A" in FIG. 4) in such a portion cannot perform the proper behavior and hence, at the time of performing the black display in the light transmitting region LTA, the complete black display cannot be performed at such a portion.

In the liquid crystal display device according to the present invention, the holding capacitance electrode CT and the holding capacitance line CL are formed at the portions which cannot receive the proper rubbing treatment as the light shielding layers. In the manufacturing steps of the liquid crystal display device, it is difficult to form the light shielding layers (not shown in the drawing) only over the regions which cannot receive the proper rubbing treatment. In the cross-sectional view shown in FIG. 4, by taking the positional displacement in the manufacturing steps of the liquid crystal display device into consideration, an end portion of the opening HL formed in the the organic protective film PAS2 is arranged on the light shielding layer. Since the light shielding layer is formed such that the light shielding layer strides over the light reflecting region LRA and the light transmitting region LTA and hence, it is possible to surely perform the light shielding in the region which cannot receive the proper rubbing treatment. Further, in the liquid crystal display device shown in FIG. 4, the protective film PAS2 is formed over the light shielding layer and hence, the light shielding region can be narrowed. Accordingly, the brightness of the screen in the light transmitting mode and the light reflecting mode can be enhanced.

Here, FIG. 4 also shows a transparent substrate (a second substrate) SUB2 which is arranged on the transparent substrate SUB1 by way of the liquid crystal layer LC. On a liquid-crystal-side surface of the second substrate SUB2, color filters FIL, an overcoat film OC, counter electrodes CT and an orientation film ORI2 are formed.

Further, in this embodiment, the light shielding layer is configured such that the light shielding layer is not formed at a position close to the thin film transistor TFT. The reasons are as follows. First of all, by forming the portion where the light shielding layer is not formed at the boundary portion between the light transmitting region LTA and the light reflecting region LRA, it is possible to form a region where the light transmitting electrode TPX formed of the light transmitting conductive layer does not stride over the light shielding layer. The light transmitting electrode TPX has the property that it is liable to easily generate the broken step at the portion where the stepped portion exists. This embodiment obviates the electric disconnection of the light transmitting electrode TPX which is formed in the light transmitting region LTA from the source electrode SD2 of the thin film transistor TFT due to such a broken step.

Further, the reason that the portion which is close to the thin film transistor TFT is particularly chosen as the portion where the light shielding layer is not formed is that this constitution can eventually increase the distance between the light shielding layer and the gate electrode GT of the thin film transistor TFT so as to obviate the electric connection therebetween.

Figure 5:
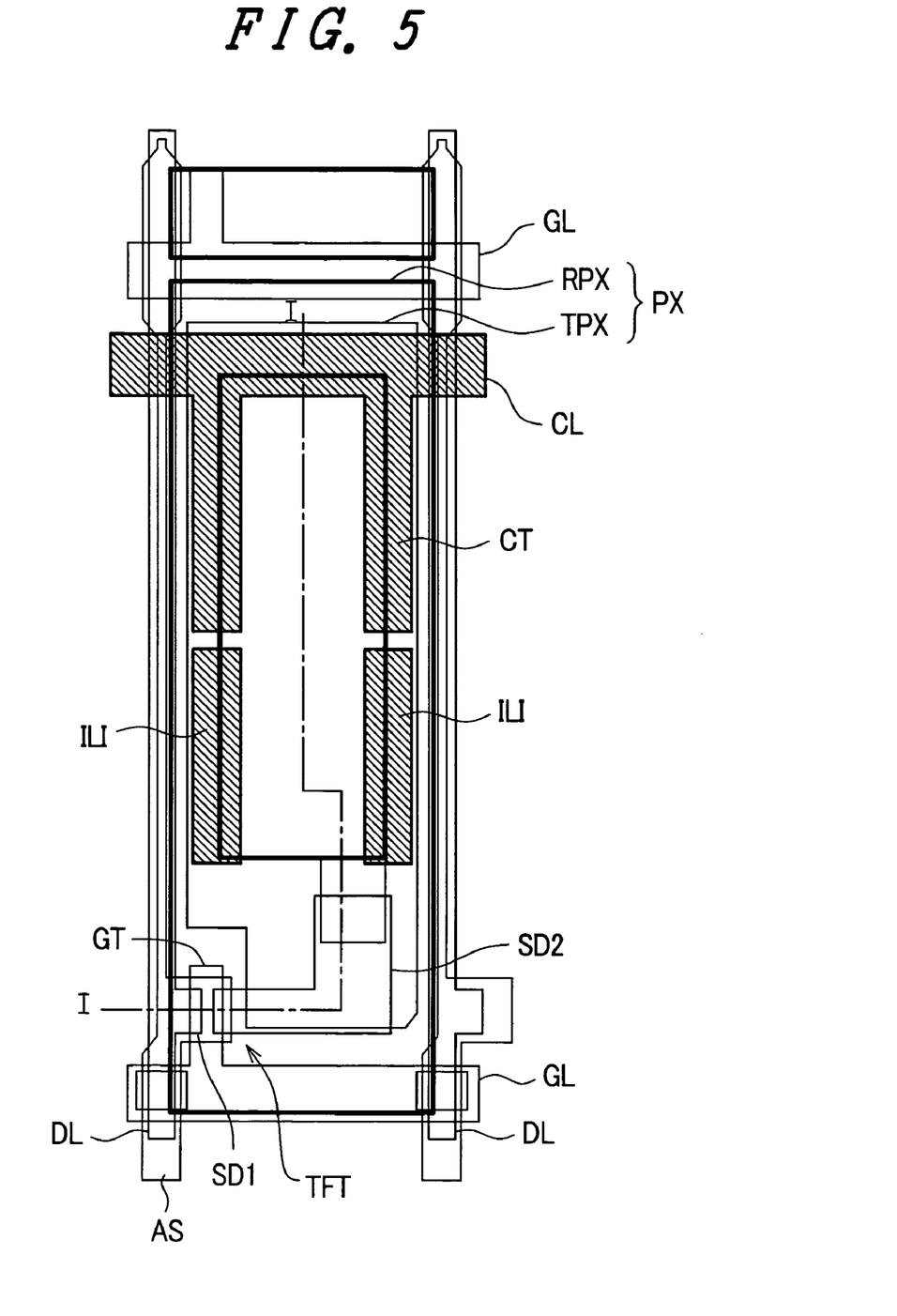
FIG. 5 is a plan view for explaining another embodiment of the pixel of the liquid crystal display device according to the present invention.

FIG. 5 is a plan view showing another embodiment of the pixel of the liquid crystal display device according to the present invention. The cross-sectional structure taken along a line I-I in FIG. 5 is substantially equal to the cross-sectional structure in FIG. 2. With respect to the pixel shown in FIG. 5, the holding capacitance electrode CT extending from the holding capacitance line CL has a portion there of cutoff. Since other constitutions are substantially equal to the corresponding constitution in FIG. 2, their explanation is omitted. That is, in FIG. 5, although the light shielding layer ILI is formed over the same layer as the gate line GL, the gate electrode GT, the holding capacitance line CL and the holding capacitance electrode CT, the light shielding layer ILI is not electrically connected with the holding capacitance electrode CT. Due to the constitution of this embodiment, the adjustment of the holding capacitance of the pixel electrode can be easily performed.

Figure 6:
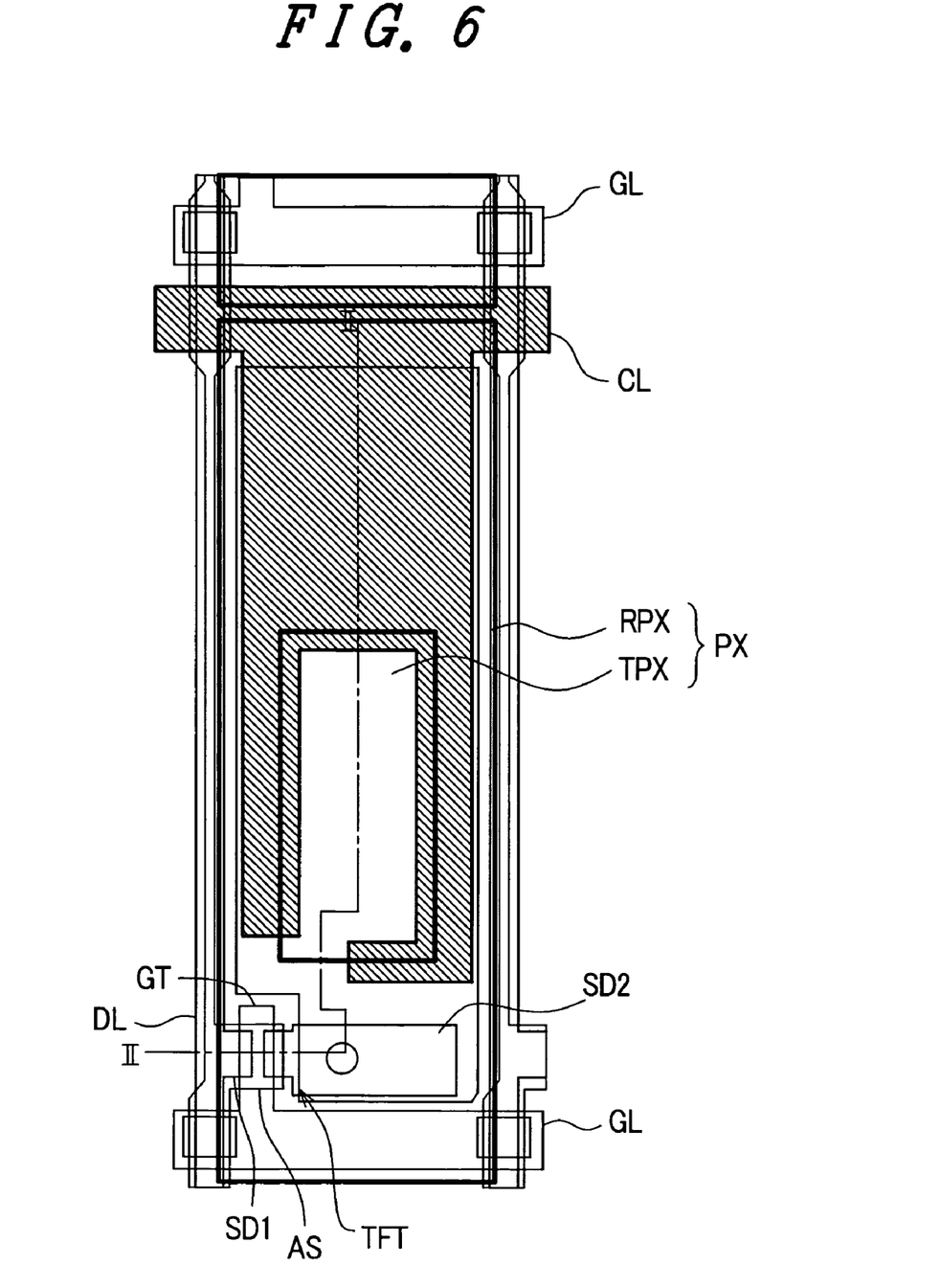
FIG. 6 is a plan view for explaining still another embodiment of the pixel of the liquid crystal display device according to the present invention.
Figure 7:
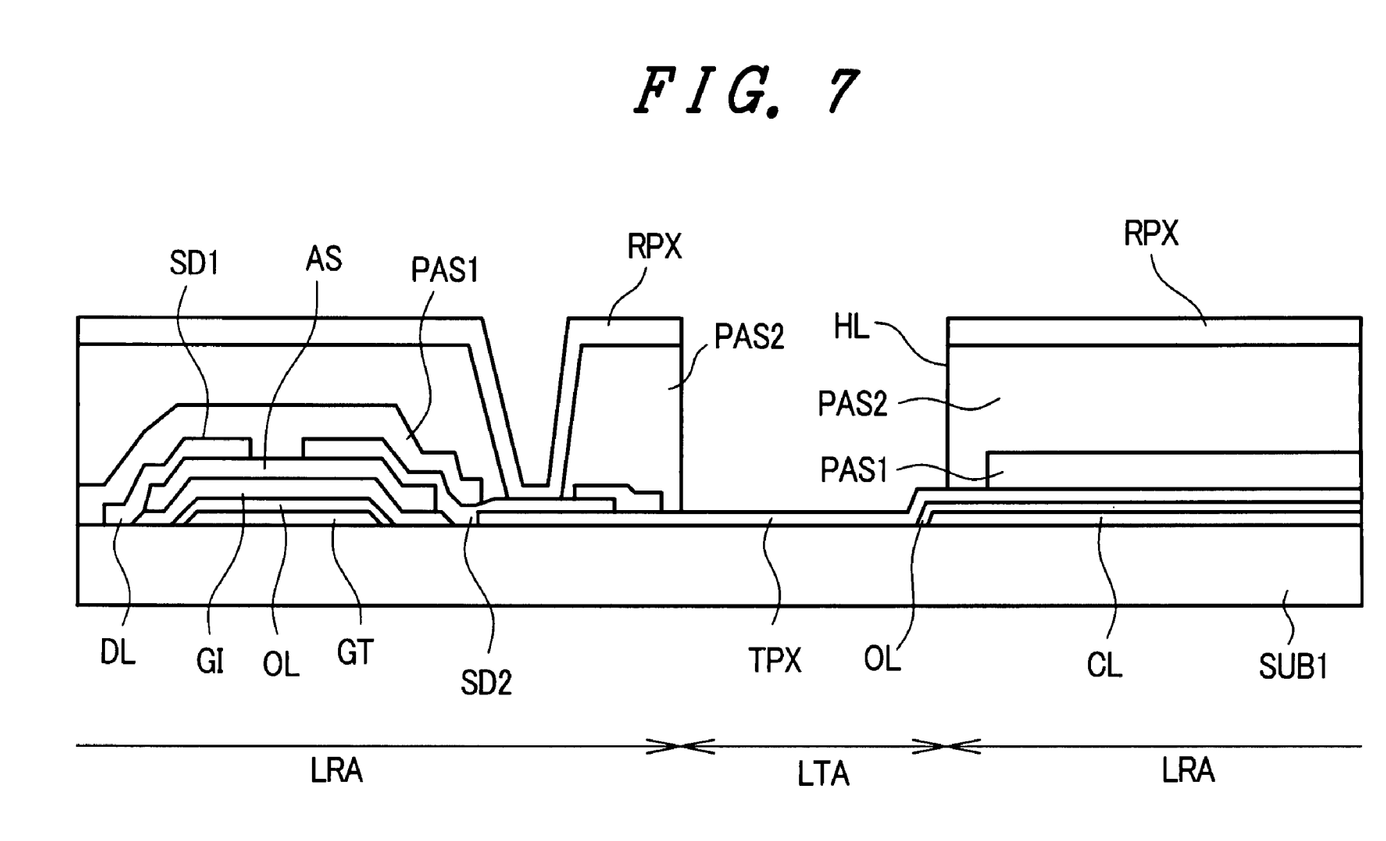
FIG. 7 is a cross-sectional view taken along a line II-II in FIG. 6.

FIG. 6 is a plan view showing another embodiment of the pixel of the liquid crystal display device according to the present invention. Further, FIG. 7 is a cross-sectional view taken along a line II-II in FIG. 6. In this embodiment, the light transmitting region LTA is decreased and the light reflecting region LRA is increased. The holding capacitance electrode CT extends from the holding capacitance line CL to a lower layer of the reflecting electrode layer and reaches the light transmitting region beyond an end portion of the opening HL formed in the organic protective film PAS2. Since the holding capacitance electrode CT is not separated at a portion having a light shielding function and a portion which is disposed below the light reflecting electrode thus having no light shielding function, it is possible to efficiently obtain the holding capacitance.

As can be clearly understood from the foregoing explanation, according to the liquid crystal display device of the present invention, it is possible to prevent the generation of the frame-like brightness difference at the portion which surrounds the light transmitting region. Further, even when the light transmitting region is increased, it is possible to sufficiently ensure the holding capacitance and hence, an image display of high contrast and high quality can be obtained.

What is claimed is:

1. A liquid crystal display device comprising a first substrate and a second substrate which are arranged to face each other with a liquid crystal layer therebetween, wherein the first substrate includes a plurality of gate lines which extend in a first direction, a plurality of drain lines which extend in the second direction, and holding capacitance lines which extend in the first direction parallel to the gate lines and crossing the drain lines, wherein a pixel and a switching element are provided to a region which is surrounded by two neighboring gate lines out of the plurality of gate lines and two neighboring drain lines out of the plurality of drain lines, the pixel includes a light transmitting region which allows light incident from a back surface of the first substrate to pass therethrough and a light reflecting region which allows light incident from the second substrate side to be reflected thereon, the light transmitting region includes a first pixel electrode having the light transmitting property and the light reflecting region includes a second pixel electrode having the light reflecting property, an insulation film and a holding capacitance electrode which extends in the second direction and is connected to one of the holding capacitance lines are provided below the second pixel electrode, the holding capacitance electrode is formed on the same layer as the gate lines, a boundary between the light transmitting region and the light reflecting region is shaped rectangular and has two first sides extending in the first direction and two second sides extending in the second direction, at least one of the holding capacitance lines is formed in an overlapped manner to one of the first sides, and is formed of a material having a light shielding property, and the holding capacitance electrode is formed in an overlapped manner to at least one part of the second sides, and is formed of a material having a light shielding property.

2. A liquid crystal display device according to claim 1, wherein the first pixel electrode is formed over the holding capacitance electrode and a holding capacitance is formed by way of an anodized film formed over the holding capacitance electrode.

* * * * *